US012697802B2

(12) United States Patent
Varanasi

(10) Patent No.: US 12,697,802 B2
(45) Date of Patent: Aug. 4, 2026

(54) COATED GLASS ARTICLE

(71) Applicant: Pilkington Group Limited, Lathom (GB)

(72) Inventor: Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 124 days.

(21) Appl. No.: 18/264,081

(22) PCT Filed: Feb. 4, 2022

(86) PCT No.: PCT/GB2022/050300
§ 371 (c)(1),
(2) Date: Aug. 3, 2023

(87) PCT Pub. No.: WO2022/167810
PCT Pub. Date: Aug. 11, 2022

(65) Prior Publication Data
US 2024/0109274 A1 Apr. 4, 2024

Related U.S. Application Data

(60) Provisional application No. 63/146,068, filed on Feb. 5, 2021.

(51) Int. Cl.
B32B 17/10 (2006.01)
B32B 7/12 (2006.01)

(52) U.S. Cl.
CPC .......... B32B 17/10449 (2013.01); B32B 7/12 (2013.01); B32B 17/10036 (2013.01);
(Continued)

(58) Field of Classification Search
None
See application file for complete search history.

(56) References Cited

U.S. PATENT DOCUMENTS

| | | | |
|---|---|---|---|
| 6,538,192 | B1 | 3/2003 | Coster et al. |
| 7,019,260 | B1 | 3/2006 | Degand et al. |

(Continued)

FOREIGN PATENT DOCUMENTS

| | | |
|---|---|---|
| DE | 102008014089 A1 | 9/2009 |
| EP | 2192093 A1 | 6/2010 |

(Continued)

OTHER PUBLICATIONS

PPG Industries, Inc., Soar Performance Group, Solarphire VP High-Transmissive Glass, 2010.
(Continued)

*Primary Examiner* — Kim S. Horger
(74) *Attorney, Agent, or Firm* — Marshall & Melhorn, LLC

(57) ABSTRACT

A coated glass article and a method for its production are provided. One or more coatings and layers are applied onto or disposed between a pair of glass sheets to produce such coated glass article that enhances an accuracy and reliability of a heads-up-display system and an optical sensor coupled thereto. More particularly, the coated glass article includes an antireflective layer to facilitate a light transmission of at least 80% for a plurality of wavelengths through the coated glass article and a visible light reflective layer to enhance a visible light reflectance of the coated glass article to between 8.0% and 10.0%.

21 Claims, 7 Drawing Sheets

(52) U.S. Cl.
CPC .... *B32B 17/10238* (2013.01); *B32B 2255/26* (2013.01); *B32B 2264/1021* (2020.08); *B32B 2264/1022* (2020.08); *B32B 2307/412* (2013.01); *B32B 2307/416* (2013.01); *B32B 2307/7376* (2023.05); *B32B 2329/06* (2013.01); *B32B 2367/00* (2013.01); *B32B 2457/20* (2013.01)

(56)  References Cited

U.S. PATENT DOCUMENTS

| | | | |
|---|---|---|---|
| 8,025,957 | B2 | 9/2011 | Theil |
| 8,227,079 | B2 | 7/2012 | Torr et al. |
| 2010/0101649 | A1 | 4/2010 | Huignard et al. |
| 2010/0189996 | A1 | 7/2010 | Torr et al. |
| 2011/0027515 | A1 | 2/2011 | Melcher et al. |
| 2011/0199674 | A1 | 8/2011 | Melcher et al. |
| 2014/0326314 | A1 | 11/2014 | Dogimont et al. |
| 2016/0018949 | A1 | 1/2016 | Lambricht et al. |
| 2016/0159681 | A1 | 6/2016 | Lambricht et al. |
| 2016/0194241 | A1 | 7/2016 | Lambricht et al. |
| 2019/0225534 | A1 | 7/2019 | Fedullo et al. |
| 2020/0109081 | A1 | 4/2020 | Lambricht et al. |
| 2020/0309997 | A1 | 10/2020 | Ma et al. |
| 2020/0408954 | A1* | 12/2020 | Koch, III ............... G02B 1/113 |
| 2021/0018749 | A1 | 1/2021 | Fischer et al. |
| 2023/0364889 | A1 | 11/2023 | Torr et al. |
| 2023/0373195 | A1 | 11/2023 | Varanasi et al. |

FOREIGN PATENT DOCUMENTS

| | | |
|---|---|---|
| EP | 3357893 A1 | 8/2018 |
| KR | 20150000095 A | 1/2015 |
| WO | 2014128016 A1 | 8/2014 |
| WO | 2014180679 A1 | 11/2014 |
| WO | 2015011041 A1 | 1/2015 |
| WO | 2015011042 A1 | 1/2015 |
| WO | 2015011043 A1 | 1/2015 |
| WO | 2015011044 A1 | 1/2015 |
| WO | 2015091106 A1 | 6/2015 |
| WO | 2015170771 A1 | 11/2015 |
| WO | 2016202606 A1 | 12/2016 |
| WO | 2016202689 A1 | 12/2016 |
| WO | 2018178286 A1 | 10/2018 |
| WO | 2020025360 A1 | 6/2020 |
| WO | 2021069746 A1 | 4/2021 |
| WO | 2021136907 A1 | 7/2021 |
| WO | 2022064226 A1 | 3/2022 |

OTHER PUBLICATIONS https://www.wired.com/2013/02/russian-dash-cams/, Lavrinc, Damon, Why almost Everyone in Russia Has a Dash Cam, Feb. 2013.

European Patent Office, International Search Report and Written Opinion in Application No. PCT/GB2022/050300, dated Oct. 5, 2022, 12 pages, Rijswijk, Netherlands.

* cited by examiner 10, 10′

A 26, 26′

A 8, 8′

| LAMINATE CONSTRUCTION | R-1 | R-4 | T-905(NORMAL) | T-905(60) |
|---|---|---|---|---|
| 2.1 mm LOW Fe GLASS/PVB/2.1 mm LOW Fe GLASS | 8.7 | 8.7 | 88.4 | 81 |
| 2.1 mm LOW Fe GLASS/PVB/2.1 mm LOW Fe GLASS/130 nm SiO$_2$ | 7.2 | 7.2 | 90.5 | 82.4 |
| 2.1 mm LOW Fe GLASS/PVB/2.1 mm LOW Fe GLASS/130 nm SiO$_2$/ 8 nm SnO$_2$ | 8.6 | 8.6 | 90.5 | 82.5 |

FIG. 4

| MONOLITHIC CONSTRUCTION | TVIS | HAZE | RF | a* | b* | T-905 |
|---|---|---|---|---|---|---|
| 2.3 mm LOW Fe GLASS | 92.3 | 0.06 | 8.8 | -0.12 | -0.93 | 90.5 |
| 2.3 mm LOW Fe GLASS/146 nm SiO₂ | 93.2 | 0.06 | 7.8 | -0.44 | -3.2 | 92.0 |
| 2.3 mm LOW Fe GLASS/146 nm SiO₂/10 nm SnO₂ | 92.4 | 0.07 | 8.45 | -0.8 | -3.5 | 92.0 |
| 2.3 mm LOW Fe GLASS/146 nm SiO₂/12 nm SnO₂ | 92.4 | 0.07 | 8.65 | -0.85 | -3.6 | 92.1 |

FIG. 7

COATED GLASS ARTICLE

BACKGROUND OF THE INVENTION

The subject matter of the embodiments described herein relates generally to a glass article and, more particularly, to a coated glass article that optimizes infrared light transmission and visible light reflection.

A conventional glass article typically comprises either monolithic glass or a laminated glazing. A monolithic glass article consists of a single piece of glass that can be enhanced through additional processes for insulating capabilities, design improvements, and added strength. Normally, the monolithic glass article may be used in building skylights and windows. On the contrary, a laminated glazing glass article typically comprises two glass sheets joined together by an adhesive interlayer. The adhesive interlayer may be produced from certain materials such as polyvinyl butyral (PVB), ethylene-vinyl acetate (EVA), or Thermoplastic Polyurethane (TPU), for example, which causes the glass sheets to shatter into smaller, less hazardous pieces when the laminated glazing glass article is broken. Such beneficial feature allows the laminated glazing glass article to be utilized in applications where there is a possibility of human exposure, such as automobile windshields and windows.

An ability to control a light transmission and light reflection of the glass article also makes it suitable for certain applications where certain amounts of light and/or heat radiation through and light reflection of the glass article are desired. One such application is for a windshield used in motor vehicles.

Commercial and passenger vehicles are being designed to use technology such as head-up-display (HUD) systems and sensors, for example, to increase safety, road capacity, and fuel efficiency while reducing pollution, driver stress, and operating costs. The HUD system displays information projected onto the glass article (e.g. the vehicle windshield) reflecting towards a driver or observer, providing the driver of the vehicle with relevant information, without having to look away from the forward field of vision of the vehicle.

These vehicles are also designed to detect surroundings using various sensors including, but not limited to optical sensors such as radar, LIDAR (Light Detection And Ranging), GPS, Odometry, and computer vision, for example. Typically, the optical sensor is mounted on an interior surface of the glass article to provide a suitable position for geometrical distance estimation, an enhanced view of a road surface and traffic situation, and a controlled environment to operate the optical sensor. However, the optical sensors require an increased infrared light transmission and are therefore not fully compatible with conventional glass article configurations.

Currently, the prior art glass articles employed as vehicle windshields either provide an insufficient amount of infrared light with enough intensity to be transmitted through the windshield for proper operation and performance of the LIDAR sensor, or when the prior art glass articles are treated, such as with an antireflective coating to increase the infrared light transmission for proper operation and performance of the LIDAR sensor, the visible light reflection of the glass articles is not sufficient for proper operation and performance of the HUD system.

Accordingly, it would be desirable to produce a glass article including at least one coating that optimizes the infrared light transmission therethrough for proper operation and performance of an optical sensor, while maintaining sufficient visible light reflection for proper operation and performance of a HUD system.

SUMMARY OF THE INVENTION

In concordance and agreement with the present disclosure, a glass article including at least one coating that optimizes the infrared light transmission therethrough for proper operation and performance of an optical sensor, while maintaining sufficient visible light reflection for proper operation and performance of a HUD system, has surprisingly been discovered.

In one embodiment, a coated glass article, comprises: a first glass sheet; an antireflective layer disposed adjacent at least a portion of the first glass sheet; and a visible light reflective layer disposed over at least a portion of the antireflective layer, the visible light reflective layer having a refractive index of at least 1.6 and a thickness of no more than 30 nm, wherein the coated glass article exhibits a light transmission of at least 80% for at least one wavelength of infrared light and a visible light reflectance of between about 8% and 10%.

As aspects of certain embodiments, the first glass sheet is produced from a generally low-light absorption, high-light transmission glass material.

As aspects of certain embodiments, the glass material has an iron content less than 100 ppm, preferably 10 ppm or less.

As aspects of certain embodiments, further comprises a second glass sheet, wherein the first and second glass sheets are joined together by an adhesive layer.

As aspects of certain embodiments, the adhesive layer includes at least one ply of at least one of polyvinyl butyral (PVB), ethylene vinyl acetate (EVA), polyvinyl chloride (PVC), polyurethane (PU), acoustic modified PVB and Uvekol® (a liquid curable acrylic resin).

As aspects of certain embodiments, the adhesive layer comprises a plurality of plies.

As aspects of certain embodiments, the adhesive layer includes a first ply formed of PVB, a second ply formed of polyethylene terephthalate (PET), and a third ply formed of PVB.

As aspects of certain embodiments, the second glass sheet is produced from a generally low-light absorption, high-light transmission glass material.

As aspects of certain embodiments, this glass material has an iron content less than 100 ppm, preferably 10 ppm or less.

As aspects of certain embodiments, the coated glass article further comprises at least one reflecting layer. The reflecting layer may be a solar and/or infrared reflecting layer.

As aspects of certain embodiments, the at least one reflecting layer is disposed adjacent at least a portion of one of the first sheet and the second sheet.

As aspects of certain embodiments, the at least one reflecting layer is incorporated into a multi-ply interlayer.

As aspects of certain embodiments, the glass article may include a plurality of reflecting layers disposed adjacent at least one of the first and second glass sheets and incorporated into a multi-ply layer.

As aspects of certain embodiments, the at least one reflecting layer comprises a metal material.

As aspects of certain embodiments, the at least one reflecting layer includes at least one void formed therein.

As aspects of certain embodiments, the antireflective layer is formed to cover at least a portion of at least one of the first and second sheets.

As aspects of certain embodiments, each of the first sheet and the second sheet includes a first major surface and a second major surface, and wherein the antireflective layer is disposed adjacent at least a portion of the second major surface of the second sheet.

As aspects of certain embodiments, the antireflective layer has a thickness of at least 80 nm.

As aspects of certain embodiments, the antireflective layer has a thickness in a range of about 120 nm to about 200 nm.

As aspects of certain embodiments, the antireflective layer is formed of silicon dioxide ($SiO_2$).

As aspects of certain embodiments, the antireflective layer facilitates a light transmission of at least 94% for the at least one wavelength through the coated glass article.

As aspects of certain embodiments, the at least one wavelength is in a range of about 750 nm to about 1 mm.

As aspects of certain embodiments, the antireflective layer facilitates a desired light transmission for at least one of a first wavelength and a second wavelength.

As aspects of certain embodiments, the first wavelength is about 905 nm.

As aspects of certain embodiments, the second wavelength is about 1550 nm.

As aspects of certain embodiments, further comprising an optical sensor disposed adjacent at least one of the antireflective layer and the visible light reflective layer, wherein the optical sensor is configured to emit a light beam having the at least one wavelength.

As aspects of certain embodiments, wherein the optical sensor is positioned in alignment with a void formed in the at least one reflecting layer of the coated glass article.

As aspects of certain embodiments, the visible light reflective layer is formed to cover at least a portion of the coated glass article.

As aspects of certain embodiments, the visible light reflective layer has a thickness in a range of about 6 nm to about 9 nm.

As aspects of certain embodiments, the visible light reflective layer is a metal oxide having a refractive index of at least 1.6 and less than 1.8 and a thickness of no more than 30 nm.

As aspects of certain embodiments, the visible light reflective layer is a metal oxide having a refractive index of at least 1.8 and a thickness of no more than 20 nm.

As aspects of certain embodiments, the visible light reflective layer is formed of tin oxide ($SnO_2$).

As aspects of certain embodiments, the visible light reflective layer facilitates a visible light reflectance value of about 8.6% at an exterior surface of the coated glass article and a visible light reflectance value of about 8.6% at an interior surface of the coated glass article.

As aspects of certain embodiments, the visible light reflective layer is disposed over at least a portion of the antireflective layer in an area of a heads-up-display (HUD) system.

As aspects of certain embodiments, the first glass sheet and the second glass sheet each have a thickness in a range of about 0.7 mm to 12 mm, preferably about 2.2 mm.

As aspects of certain embodiments, the coated glass article comprises a single glass sheet which may have a thickness about 2.3 mm.

As aspects of certain embodiments, the coated glass article is configured to be used as an automotive window.

As aspects of certain embodiments, the coated glass article is configured to be used a window in building structures.

Note that references herein to a layer or sensor being adjacent a sheet, surface or other layer include references to that layer or sensor provided directly on the sheet, surface or other layer.

Note also that references herein to a layer being disposed over a glass sheet, surface or other layer include references to that layer being provided directly on the sheet, surface or other layer.

In another embodiment, a coated glass article, comprises: a first sheet formed of a glass material having a content of iron oxide ($Fe_2O_3$) of about 100 ppm or less; a second sheet formed of a glass material having a content of iron oxide ($Fe_2O_3$) of about 100 ppm or less; an adhesive layer interposed between the first and second sheets to join the first sheet to the second sheet; an antireflective layer disposed over one of the first and second sheets, wherein the antireflective layer facilitates a light transmission of at least 80% for at least one infrared wavelength through the coated glass article; and a visible light reflective layer disposed over the antireflective layer, the visible light reflective layer having a refractive index of at least 1.6 and a thickness of no more than 30 nm, wherein the coated glass article exhibits a light transmission of at least 80% for the at least one infrared wavelength and a visible light reflectance of between about 8% and 10%.

As aspects of certain embodiment, the visible light reflective layer is disposed over at least a portion of the antireflective layer in an area of a heads-up-display (HUD) system.

As aspects of certain embodiments, an optical sensor, such as a LIDAR sensor, is disposed adjacent at least one of the antireflective layer and the visible light reflective layer, wherein the optical sensor is configured to emit a light beam having the at least one infrared wavelength.

As aspects of certain embodiments, at least one reflecting layer is disposed adjacent at least a portion of at least one of the first sheet and the second sheet.

As aspects of certain embodiments, the optical sensor is position in alignment with a void formed in the at least one reflecting layer.

In yet another embodiment, a method of producing a coated glass article, comprises: providing a first sheet; disposing an antireflective layer adjacent the first sheet; and disposing a visible light reflective layer on at least a portion of the antireflective layer, the visible light reflective layer having a refractive index of at least 1.6 and a thickness of no more than 30 nm, wherein the coated glass article exhibits a light transmission of at least 80% for at least one wavelength of infrared light and a visible light reflectance of between about 8% and 10%.

Aspects of certain embodiments in the method will be apparent from those described in relation to the coated glass article.

BRIEF DESCRIPTION OF THE FIGURES

The above, as well as other objects and advantages of the subject matter of the embodiments described herein, will become readily apparent to those skilled in the art from a reading of the following detailed description of the embodiments when considered in the light of the accompanying drawings in which:

FIG. 4 is a table providing modeled results for a coated laminated glass article including a visible light reflectance value of an exterior surface (R-1) and an interior surface (R-4) of the coated glass article, and a light transmission percentage for the 905 nm wavelength at a normal position and at a 60° rake angle from vertical of the coated glass article;

FIG. 7 is a table providing actual trial data for coated monolithic glass articles including various characteristics of an uncoated glass article, a glass article coated with an antireflective layer of silicon dioxide ($SiO_2$) having a thickness of about 146 nm, a glass article coated with an antireflective layer of silicon dioxide ($SiO_2$) having a thickness of about 146 nm and a visible light reflective layer of tin oxide ($SnO_2$) having a thickness of about 10 nm, and a glass article coated with an antireflective layer of silicon dioxide ($SiO_2$) having a thickness of about 146 nm and a visible light reflective layer of tin oxide ($SnO_2$) having a thickness of about 12 nm.

DETAILED DESCRIPTION OF THE INVENTION

The following detailed description and appended drawings describe and illustrate various exemplary embodiments. The description and drawings serve to enable one skilled in the art to make and use the embodiments, and are not intended to limit the scope of the embodiments in any manner.

Figure 1:
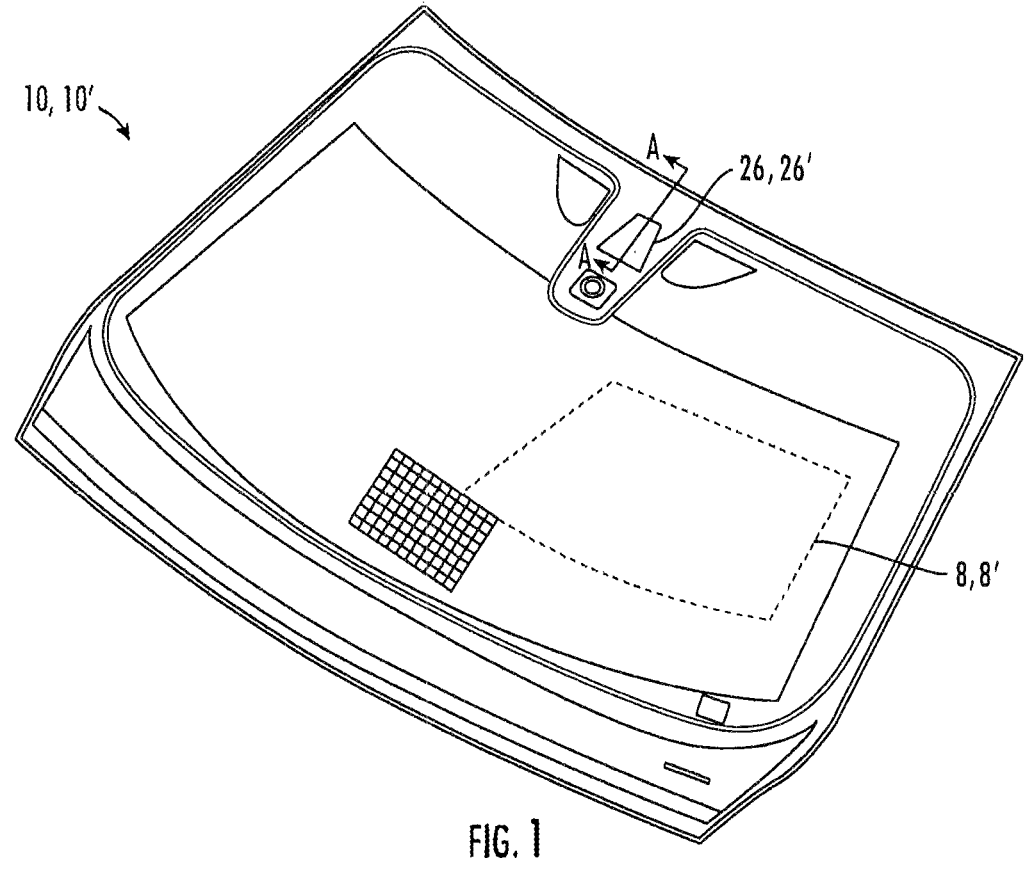
FIG. 1 is a schematic isometric view of a coated glass article comprising a laminated glazing according to an embodiment of the presently disclosed subject matter, wherein the laminated glazing is employed as a windshield for a vehicle.
Figure 5:
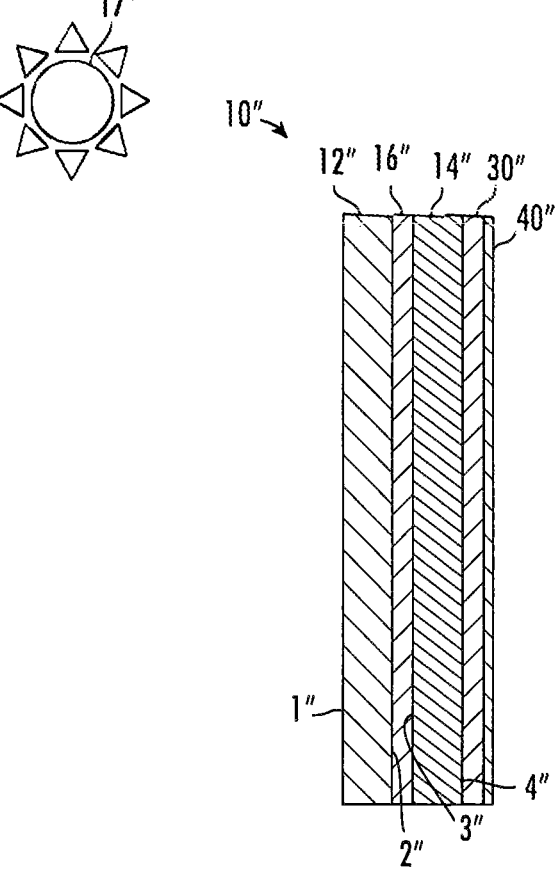
FIG. 5 is a cross-sectional view of a coated glass article according to another embodiment of the presently disclosed subject matter.
Figure 6:
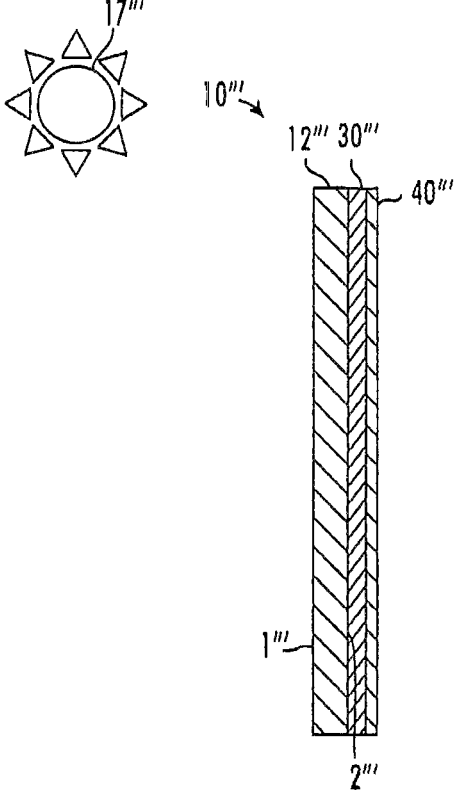
FIG. 6 is a cross-sectional view of a coated glass article comprising a monolithic glass sheet according to another embodiment of the presently disclosed subject matter.

FIGS. 1-3 and 5 depict glass articles 10, 10', 10" each having a laminated construction and FIG. 6 depicts a glass article 10''' having a monolithic construction. According to the presently disclosed subject matter, each of the glass articles 10, 10', 10", 10''' may be planar. However, the glass articles 10, 10', 10", 10''' may also be curved such as employed in the case in the automotive industry for rear windows, side windows, sun and moon roofs, and especially windshields as shown in FIG. 1. Preferably, a radius of curvature in at least one direction may be in a range of about 500 mm to about 20,000 mm, and more preferably, in a range of about 1000 mm to about 8,000 mm.

Each of the glass articles 10, 10', 10", 10''' may be configured to be used with a heads-up-display (HUD) system 8, 8' (shown in FIG. 1) and an optical sensor 11 (shown in FIGS. 2 and 3) in a vehicle (not depicted). It should be appreciated that the HUD system 8, 8' may be any HUD system 8, 8' as desired. Additionally, each of the glass articles 10, 10', 10", 10''' may be configured to be utilized as a window in building structures. It should be appreciated, however, that the glass articles 10, 10', 10", 10''' may be used in various other applications wherein a certain visible light reflectance and infrared light transmission through the glass articles 10, 10', 10", 10''' is desired. It is understood that the glass articles 10, 10', 10", 10''' may be employed in various industrial, commercial, residential, and automotive applications.

The glass articles 10, 10', 10", 10''' of the presently disclosed subject matter may be positioned at a rake angle in a range of about 50° to 70° from vertical and may have a light transmission (when measured with CIE Illuminant A) of at least 75% for two or more wavelengths in a range of about 750 nm to 1 mm, and each of an exterior and interior visible light reflectance may be in a range of about 7.0% to about 10.0%. Preferably, each of the glass articles 10, 10', 10", 10''' may be positioned at a rake angle of about 60° from vertical, at least a first portion of the glass articles 10, 10', 10", 10''' may have a light transmission (when measured with CIE Illuminant A) of at least 94% at a first wavelength of about 905 nm and a second wavelength of about 1550 nm, and at least a second portion of the glass articles 10, 10', 10", 10''' may have the exterior and interior visible light reflectance substantially the same as that of an uncoated glass article, preferably may be in a range of about 8% to about 9%, and more preferably the exterior visible light reflectance may be at about 8.6% and the interior visible light reflectance may be at about 8.8%.

Figure 2:
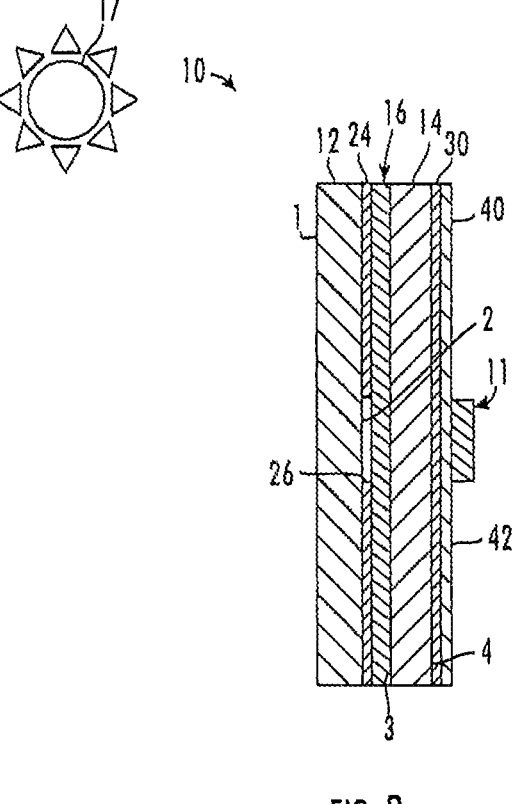
FIG. 2 is a cross-sectional view taken along the line A-A of the coated glass article according to an embodiment of the presently disclosed subject matter.

Referring now to FIG. 2, the glass article 10 depicted is a laminated glazing according to one embodiment of the presently disclosed subject matter. As shown, the glass article 10 may include a first sheet 12 and a second sheet 14 joined to the first sheet 12 by an adhesive interlayer 16. The first and second sheets 12, 14 may be substantially clear and transparent to visible light. Each of the first and second sheets 12, 14 may be produced from a generally low-absorption, high-transmission glass material. In certain embodiments, the first and second sheets 12, 14 may be produced from any glass composition and produced through the use of any glass manufacturing process. Preferably, each of the first and second sheets 12, 14 may be produced from a soda-lime-silica material. The soda-lime-silica material may comprise (by weight), silicon dioxide ($SiO_2$) 70-75%; aluminum oxide ($Al_2O_3$) 0-5%; sodium oxide ($Na_2O$) 10-15%; potassium oxide ($K_2O$) 0-5%; magnesium oxide (MgO) 0-10%; calcium oxide (CaO) 5-15%; and sulfur trioxide ($SO_3$) 0-2%. It is understood, however, the first and second sheets 12, 14 each may comprise another composition such as a borosilicate material composition, for example.

In certain embodiments, each of the first and second sheets 12, 14 may be produced from a generally low-iron glass material. Preferably, the first and second sheets 12, 14 may be produced from a glass material having a content of iron oxide ($Fe_2O_3$) of about 100 ppm or less. More preferably, the content of iron oxide ($Fe_2O_3$) in the first and second sheets 12, 14 may be about 10 ppm or less. Also, transparency and/or absorption characteristics of the first and second sheets 12, 14 may vary between embodiments of the glass article 10. For example, the first and second sheets 12, 14 may be tinted. Additionally, a thickness of each of the first and second sheets 12, 14 may vary between embodiments of the glass article 10. In certain embodiments, a thickness of each of the first and second sheets 12, 14 may be in a range of about 0.7 mm to about 12 mm. Preferably, each of the first and second sheets 12, 14 may have a thickness of about 2.2 mm.

The first sheet 12 may have a first major surface 1 and an opposing second major surface 2. The second sheet 14 may have a first major surface 3 and an opposing second major surface 4. When the glass article 10 is employed as a windshield in a vehicle, the major surface 1 faces towards an exterior environment (as indicated by sun 17) and the second major surface 4 faces an interior of the vehicle. As such, the first sheet 12 is the "outer pane" of the windshield and the second sheet 14 is the "inner pane" of the windshield.

As illustrated in FIG. 2, the adhesive interlayer 16 may be interposed between the first and second sheets 12, 14. Similar to the first and second sheets 12, 14, transparency and/or absorption characteristics of the interlayer 16 may vary between the embodiments of the glass article 10. For example, the adhesive interlayer 16 may be tinted, if desired. In one embodiment shown in FIG. 2, the adhesive interlayer 16 may be a single-ply disposed adjacent the second major surface 2 of the first sheet 12 and the first major surface 3 of the second sheet 14. The single-ply adhesive interlayer 16 may be formed from a polyvinyl butyral (PVB), an ethylene vinyl acetate (EVA), a polyvinyl chloride (PVC), a polyurethane (PU), an acoustic modified PVB, and/or a liquid curable acrylic resin (e.g. Uvekol®). A thickness of the single-ply adhesive interlayer 16 may be in a range of about 0.3 mm to about 2.3 mm. Preferably, the single-ply adhesive interlayer 16 may have a thickness in a range of about 0.3 mm to about 1.1 mm, and more preferably about 0.76 mm. More preferably, the glass sheets 12, 14 of the glass article 10 may be produced from Pilkington Optiwhite™, commercially available by Pilkington Group Limited, and joined by the single-ply adhesive layer 16. In a preferred embodiment, each of the glass sheets 12, 14 may be produced from the Pilkington Optiwhite™ having a thickness of about 2.2 mm and the single-ply interlayer 16 may have a thickness of about 0.76 mm.

In certain embodiments, the glass article 10 may further include at least one reflecting layer 24. As shown in FIG. 2, the at least one reflecting layer 24 may be disposed adjacent the adhesive interlayer 16 on either the second major surface 2 of the first sheet 12 or the first major surface 3 of the second sheet 14. In certain embodiments, the glass article 10 may include a plurality of the reflecting layers 24 disposed adjacent at least one of the first and second sheets 12, 14. For example, the glass article 10 may include one of the reflecting layers 24 disposed adjacent the second major surface 2 of the first sheet 12 and another one of the reflecting layers 24 disposed adjacent the first major surface 3 of the second sheet 14.

The at least one reflecting layer 24 shown reflects solar and/or infrared radiation. In certain embodiments, the at least one reflecting layer 24 may be formed of a metal material (e.g. silver), a tin-doped indium oxide, a lanthanum hexaboride, or other such suitable infrared reflecting materials, for example. In certain embodiments, the at least one reflecting layer 24 may be deposited by sputtering. Various other methods may be used to form the at least one reflecting layer 24 if desired. Although the at least one reflecting layer 24 may extend over substantially an entire surface of the first and second sheets 12, 14, it may be formed to extend over only a portion of the surface thereof. Peripheral edges of the at least one reflecting layer 24 may be offset from peripheral edges of the first and second sheets 12, 14 and/or the adhesive interlayer 16 to militate against corrosion and damage. A thickness of the at least one reflecting layer 24 may be in a range of about 10 nm to about 20 nm. It is understood that the at least one reflecting layer 24 may have any suitable thickness as desired.

Advantageously, the at least one reflecting layer 24 may include a void 26 formed in at least one desired location to militate against potential interference of the at least one reflecting layer 24 with surrounding components (e.g. the optical sensor 11, a camera, a cellular telephone, global positioning systems, road and parking transponders, various other sensors, and the like, etc.). The void 26 in the at least one reflecting layer 24 may be formed during a manufacturing of the glass article 10 (e.g. masking the glass article 10 at the desired location) or removing a portion of the at least one reflecting layer 24 by any suitable method such as laser or mechanical deletion or etching, for example. The void 26 in the at least one reflecting layer 24 may cover at least one continuous area or be in the form of a desired configuration such as a lined or grid pattern, for example.

As shown, the glass article 10 may further include a first optical layer or antireflective (AR) layer 30. The AR layer 30 may be configured to enhance light transmission through the glass article 10. Preferably, the AR layer 30 may be formed over the second major surface 4 of the second sheet 14. More preferably, the AR layer 30 may be formed directly on second major surface 4 on the second sheet 14, essentially with no intervening layers. It is understood, however, that the AR layer 30 may be formed on other surfaces of the glass article 10 such as the first major surface 1 of the first sheet 12, for example. As non-limiting examples, the AR layer 30 may be an additional coating deposited on the second sheet 14 or an antireflective film disposed thereon. Although the AR layer 30 may extend over substantially an entire surface of the first and second sheets 12, 14, it may be formed to extend over only a portion of the surface thereof.

In one embodiment, the AR layer 30 may be a single-layer coating which comprises silicon dioxide ($SiO_2$) deposited by chemical vapor deposition (CVD). In another embodiment, the AR layer 30 may be a single-layer coating which comprises titanium oxide ($TiO_2$) nanoparticles deposited by a sol-gel process. It is understood that the AR layer 30 may be a multi-layer coating formed of any suitable material by any suitable method, as desired.

The AR layer 30 may be selectively formed at a desired thickness to achieve a desired transmission percentage therethrough. In certain embodiments, the thickness of the AR layer 30 may be such that to achieve optimal transmission of at least one of the first wavelength and the second wavelength through the glass article 10. Preferably, the thickness of the AR layer 30 may be such to achieve at least an 80% transmission of at least one of the first and second wavelengths through the glass article 10. More preferably, the thickness of the AR layer 30 may be such to achieve at least a 90% transmission of at least one of the first and second wavelengths through the glass article 10. Most preferably, the thickness of the AR layer 30 may be such to achieve at least a 94% transmission of at least one of the first and second wavelengths through the glass article 10.

In certain embodiments, the AR layer 30 may be deposited at a thickness of no less than about 80 nm, and more preferably no less than about 100 nm. In other embodiments, the thickness of the AR layer 30 may be in a range of about 80 nm to about 400 nm, preferably in a range of about 80 nm to about 160 nm, and more preferably in a range of about 120 nm to about 150 nm.

Preferably, the glass article 10 may be configured such that the light transmission (when measured with CIE Illuminant A) in a region of the glass article 10 visible by an occupant of the vehicle may be substantially equivalent to the glass article 10 without the AR layer 30, while the light transmission (when measured with CIE Illuminant A) of at least one of the first and second wavelengths in a region of the glass article 10 aligned with the optical sensor 11 may be greater than the glass article 10 without the AR layer 30. Preferably, the light transmission (when measured with CIE Illuminant A) of at least one of the first and second wavelengths in the region of the glass article 10 aligned with the optical sensor 11 may be maximized.

In certain embodiments, the glass article 10 may further include a second optical layer or visible light (VL) reflective layer 40. As shown in FIG. 2, the VL reflective layer 40 may be disposed adjacent the AR layer 30. In one embodiment, the VL reflective layer 40 may be disposed over a surface of the AR layer 30 opposite the second sheet 14. The VL reflective layer 40 shown reflects visible light with having minimal to no effect on infrared light transmission through the glass article 10. In one embodiment, the VL reflective layer 40 may be a coating which comprises tin oxide ($SnO_2$). The VL reflective layer 40 comprised of tin oxide also enhances a durability of the glass article 10. It should be appreciated that the VL reflective layer 40 may comprise other suitable visible light reflecting materials such as metal oxides having a refractive index greater than 1.6 (e.g. aluminum oxide ($Al_2O_3$), titanium dioxide ($TiO_2$), chromium oxide ($Cr_2O_3$), and niobium oxide (NbO)).

In certain embodiments, the VL reflective layer 40 may be deposited by sputtering. Various other methods may be used to form the VL reflective layer 40 if desired. Although the VL reflective layer 40 may extend over substantially an entire surface of the AR layer 30, it may be formed to extend over only a portion of the surface thereof. In certain embodiments, the VL reflective layer 40 may be disposed over the AR layer 30 in an area of the HUD system 8 to reflect the visible light and allow for proper operation of the HUD system 8. A thickness of the VL reflective layer 40 may be in a range of about 5 nm to about 20 nm, preferably in a range of about 5 nm to about 12 nm, and more preferably in a range of about 6 nm to about 9 nm. It is understood that the VL reflective layer 40 may have any suitable thickness as desired.

In a preferred embodiment, the VL reflective layer 40 may comprise a metal oxide having a refractive index of at least 1.6 and less than 1.8 and a thickness of no more than 30 nm. In more preferred embodiments, the VL reflective layer 40 may comprise a metal oxide having a refractive index of at least 1.8 and a thickness of no more than 20 nm.

In certain embodiments, the optical sensor 11 may be a light detection and ranging (LIDAR) type of sensor. Such LIDAR sensors include but are not limited to pedestrian detection sensors, pre-crash sensors, closing velocity sensors, and adaptive cruise control sensors, for example. In other embodiments, the optical sensor 11 may be an optoelectronic system comprised of at least a laser or sensing beam transmitter, at least a receiver including a light or sensing beam collector (telescope or other optics) and at least one photodetector which converts the light or sensing beam into an electrical signal, and an electronic processing chain signal that extracts the information sought.

The optical sensor 11 may be configured to emit the sensing beam through the glass article 10, which strikes a remote object. The sensing beam may be reflected off of the object, caused to pass back through the glass article 10, and detected by the receiver of the optical sensor 11. Most often, each of the initial sensing beam emitted from the optical sensor 11 and the reflected sensing beam received by the optical sensor 11 may have the same wavelength, preferably one of the first and second wavelengths. The at least one photodetector may be configured to convert the sensing beam into the electrical signal which may be then transmitted to a controller or microcontroller (not depicted).

As illustrated, the optical sensor 11 may be disposed on the second major surface 4 of the second sheet 12. It is understood, however, that the optical sensor 11 may be positioned at other suitable locations on or adjacent to the glass article 10. In certain embodiments, the optical sensor 11 may be positioned in alignment with the void 26 formed in the at least one reflecting layer 24 and at least a portion of the AR layer 30 to minimize interference and maximize the transmission % of at least one of the wavelengths through the glass article 10, which results in improved accuracy and reliability of the optical sensor 11.

In one preferred embodiment, the glass article 10 includes the first sheet 12 having the at least one reflecting layer 24 disposed adjacent the second major surface 2 thereof. The single-ply adhesive layer 16 may be disposed adjacent the at least one reflecting layer 24. More particularly, the at least one reflecting layer 24 of silver may be deposited onto the adhesive layer 16 by sputtering. The void 26 may be formed in the at least one reflecting layer 24 at the desired location of the void 26 during the manufacturing of the glass article 10. The second sheet 14 may be disposed adjacent the at least one reflecting layer 24. The AR layer 30 may be then deposited onto the second major surface 4 of the second sheet 14. The VL reflective layer 40 may be then disposed adjacent the AR layer 30. The optical sensor 11 may be disposed adjacent a surface 42 of the VL reflective layer 40 in alignment with the void 26 formed in the at least one reflecting layer 24.

Figure 3:
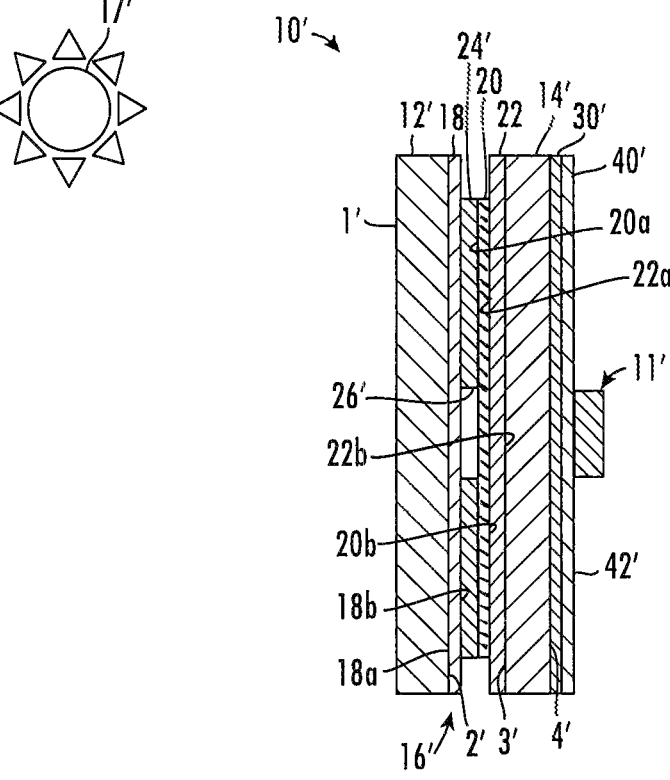
FIG. 3 is a cross-sectional view taken along the line A-A of the coated glass article according to another embodiment of the presently disclosed subject matter.

FIG. 3 shows the glass article 10' similar to that shown in FIG. 2 and is also a laminated glazing according to another embodiment of the presently disclosed subject matter. Reference numerals for similar structure in respect of the description of FIG. 2 is repeated in FIG. 3 with a prime (') symbol.

As shown, the glass article 10' may include a first sheet 12' and a second sheet 14' joined to the first sheet 12' by an adhesive interlayer 16'. The first and second sheets 12', 14' may be substantially clear and transparent to visible light. Each of the first and second sheets 12', 14' may be produced from a generally low-absorption, high-transmission glass material. In certain embodiments, the first and second sheets 12', 14' may be produced from any glass composition and produced through the use of any glass manufacturing process. Preferably, each of the first and second sheets 12', 14' may be produced from a soda-lime-silica material. The soda-lime-silica material may comprise (by weight), silicon dioxide ($SiO_2$) 70-75%; aluminum oxide ($Al_2O_3$) 0-5%; sodium oxide ($Na_2O$) 10-15%; potassium oxide ($K_2O$) 0-5%; magnesium oxide (MgO) 0-10%; calcium oxide (CaO) 5-15%; and sulfur trioxide ($SO_3$) 0-2%. It is understood, however, the first and second sheets 12', 14' each may comprise another composition such as a borosilicate material composition, for example.

In certain embodiments, each of the first and second sheets 12', 14' may be produced from a generally low-iron glass material. Preferably, the first and second sheets 12', 14' may be produced from a glass material having a content of iron oxide ($Fe_2O_3$) of about 100 ppm or less. More preferably, the content of iron oxide ($Fe_2O_3$) in the first and second sheets 12', 14' may be about 10 ppm or less. Also, transparency and/or absorption characteristics of the first and second sheets 12', 14' may vary between embodiments of the glass article 10'. For example, the first and second sheets 12', 14' may be tinted. Additionally, a thickness of each of the first and second sheets 12', 14' may vary between embodiments of the glass article 10'. In certain embodiments, a thickness of each of the first and second sheets 12', 14' may be in a range of about 0.7 mm to about 12 mm. Preferably, each of the first and second sheets 12', 14' may have a thickness of about 2.2 mm.

The first sheet 12' may have a first major surface 1' and an opposing second major surface 2'. The second sheet 14' may have a first major surface 3' and an opposing second major surface 4'. When the glass article 10' is employed as a windshield in a vehicle, the major surface 1' faces towards an exterior environment (as indicated by sun 17') and the second major surface 4' faces an interior of the vehicle. As such, the first sheet 12' is the "outer pane" of the windshield and the second sheet 14' is the "inner pane" of the windshield.

As illustrated in FIG. 3, the adhesive interlayer 16' may be interposed between the first and second sheets 12', 14'. Similar to the first and second sheets 12', 14', transparency and/or absorption characteristics of the interlayer 16' may vary between the embodiments of the glass article 10'. For example, the adhesive interlayer 16' may be tinted, if desired. In the embodiment shown in FIG. 3, the adhesive interlayer 16' may be a multi-ply interlayer comprising a first ply 18 formed of PVB, a second ply 20 formed of polyethylene terephthalate (PET), and a third ply 22 formed of PVB. It is understood that each of the plies 18, 20, 22 may be formed from other suitable adhesive materials as desired. Each of the plies 18, 20, 22 includes respective first surfaces 18a, 20a, 22a and opposing second surfaces 18b, 20b, 22b. As illustrated, the first ply 18 may be disposed adjacent the second major surface 2' of the first sheet 12' and the first surface 20a of the second ply 20. The second ply 20 may be disposed adjacent the second surface 18b of the first ply 18 and the first surface 22a of the third ply 22. The third ply 22 may be disposed adjacent the second surface 20b of the second ply 20 and the first major surface 3' of the second sheet 14'. A thickness of the first ply 18 may be in a range of about 0.3 mm to about 2.3 mm, and more preferably about 0.38 mm. The intermediate second ply 20 has a thickness in a range of about 0.01 mm to 1.0 mm, and more preferably about 0.05 mm. A thickness of the third ply 22 may be in a range of about 0.3 mm to about 2.3 mm, and more preferably about 0.76 mm. Various other adhesive materials may be used to produce the interlayer 16' as desired. It should be appreciated that the thickness of the adhesive interlayer 16' may vary between embodiments of the glass article 10' according to the presently disclosed subject matter. More preferably, the glass sheets 12', 14' of the glass article 10' may be produced from Pilkington Optiwhite™, commercially available by Pilkington Group Limited, and joined by the multi-ply adhesive layer 16'. In a preferred embodiment, each of the glass sheets 12', 14' may be produced from the Pilkington Optiwhite™ having a thickness of about 2.2 mm.

In certain embodiments, the glass article 10' may further include at least one reflecting layer 24'. The at least one reflecting layer 24' may be disposed adjacent the adhesive interlayer 16' on either the second major surface 2' of the first sheet 12' or the first major surface 3' of the second sheet 14'. Alternatively, as illustrated in FIG. 3, the at least one reflecting layer 24' may be incorporated into the multi-ply interlayer 16'. In one embodiment, the at least one reflecting layer 24' may be disposed on the second surface 18b of the first ply 18 adjacent the first surface 20a of the second ply 20. In another embodiment, the at least one reflecting layer 24' may be disposed on the second surface 20b of the second ply 20 adjacent the first surface 22a of the third ply 22. In certain embodiments, the glass article 10' may include three reflecting layers 24' incorporated into the multi-ply interlayer 16'. In certain embodiments, the glass article 10' may include a plurality of the reflecting layers 24' disposed adjacent at least one of the first and second sheets 12', 14' and incorporated into the multi-ply interlayer 16'. For example, the glass article 10' may include one of the reflecting layers 24' disposed on the second major surface 2' of the first sheet 12', another one of the reflecting layers 24' disposed on the first major surface 3' of the second sheet 14', and another one of the reflecting layers 24' disposed on at least one of the second surface 18b of the first ply 18 adjacent the first surface 20a of the second ply 20 and the second surface 20b of the second ply 20 adjacent the first surface 22a of the third ply 22.

The at least one reflecting layer 24' shown reflects solar and/or infrared radiation. In certain embodiments, the at least one reflecting layer 24' may be formed of a metal material (e.g. silver), a tin-doped indium oxide, a lanthanum hexaboride, or other such suitable infrared reflecting materials, for example. In certain embodiments, the at least one reflecting layer 24' may be deposited by sputtering. Various other methods may be used to form the at least one reflecting layer 24' if desired. Although the at least one reflecting layer 24' may extend over substantially an entire surface of the first and second sheets 12', 14' and/or the plies 18, 20, 22, it may be formed to extend over only a portion of the surface thereof. Peripheral edges of the at least one reflecting layer 24' and the second ply 20 may be offset from peripheral edges of the first and second sheets 12', 14' and/or the plies 18, 22 to militate against corrosion and damage. A thickness of the at least one reflecting layer 24' may be in a range of about 10 nm to about 20 nm. It is understood that the at least one reflecting layer 24' may have any suitable thickness as desired.

Advantageously, the at least one reflecting layer 24' may include a void 26' formed in at least one desired location to militate against potential interference of the at least one reflecting layer 24' with surrounding components (e.g. the optical sensor 11', a camera, a cellular telephone, global positioning systems, road and parking transponders, various other sensors, and the like, etc.). The void 26' in the at least one reflecting layer 24' may be formed during a manufacturing of the glass article 10' (e.g. masking the glass article 10' at the desired location) or removing a portion of the at least one reflecting layer 24' by any suitable method such as laser or mechanical deletion or etching, for example. The void 26' in the at least one reflecting layer 24' may cover at least one continuous area or be in the form of a desired configuration such as a lined or grid pattern, for example.

As shown, the glass article 10' may further include a first optical layer or antireflective (AR) layer 30'. The AR layer 30' may be configured to enhance light transmission through the glass article 10'. Preferably, the AR layer 30' may be formed over the second major surface 4' of the second sheet 14'. More preferably, the AR layer 30' may be formed directly on second major surface 4' on the second sheet 14', essentially with no intervening layers. It is understood, however, that the AR layer 30' may be formed on other surfaces of the glass article 10' such as the first major surface 1' of the first sheet 12', for example. As non-limiting examples, the AR layer 30' may be an additional coating deposited on the second sheet 14' or an antireflective film disposed thereon. Although the AR layer 30' may extend over substantially an entire surface of the first and second sheets 12', 14', it may be formed to extend over only a portion of the surface thereof.

In one embodiment, the AR layer 30' may be a single-layer coating which comprises silicon dioxide ($SiO_2$) deposited by chemical vapor deposition (CVD). In another embodiment, the AR layer 30' may be a single-layer coating which comprises titanium oxide ($TiO_2$) nanoparticles deposited by a sol-gel process. It is understood that the AR layer 30' may be a multi-layer coating formed of any suitable material by any suitable method, as desired.

The AR layer 30' may be selectively formed at a desired thickness to achieve a desired transmission percentage therethrough. In certain embodiments, the thickness of the AR layer 30' may be such that to achieve optimal transmission of at least one of the first wavelength and the second wavelength through the glass article 10'. Preferably, the thickness of the AR layer 30' may be such to achieve at least an 80% transmission of at least one of the first and second wavelengths through the glass article 10'. More preferably, the thickness of the AR layer 30' may be such to achieve at least a 90% transmission of at least one of the first and second wavelengths through the glass article 10'. Most preferably, the thickness of the AR layer 30' may be such to achieve at least a 94% transmission of at least one of the first and second wavelengths through the glass article 10'.

In certain embodiments, the AR layer 30' may be deposited at a thickness of no less than about 80 nm, and more preferably no less than about 100 nm. In other embodiments, the thickness of the AR layer 30' may be in a range of about 80 nm to about 400 nm, preferably in a range of about 80 nm to about 160 nm, and more preferably in a range of about 120 nm to about 150 nm.

Preferably, the glass article 10' may be configured such that the light transmission (when measured with CIE Illuminant A) in a region of the glass article 10' visible by an occupant of the vehicle may be substantially equivalent to the glass article 10' without the AR layer 30', while the light transmission (when measured with CIE Illuminant A) of at least one of the first and second wavelengths in a region of the glass article 10' aligned with the optical sensor 11' may be greater than the glass article 10' without the AR layer 30'. Preferably, the light transmission (when measured with CIE Illuminant A) of at least one of the first and second wavelengths in the region of the glass article 10' aligned with the optical sensor 11' may be maximized.

In certain embodiments, the glass article 10' may further include a second optical layer or visible light (VL) reflective layer 40'. As shown in FIG. 3, the VL reflective layer 40' may be disposed adjacent the AR layer 30'. In one embodiment, the VL reflective layer 40' may be disposed over a surface of the AR layer 30' opposite the second sheet 14'. The VL reflective layer 40' shown reflects visible light with having minimal to no effect on infrared light transmission through the glass article 10'. In one embodiment, the VL reflective layer 40' may be a coating which comprises tin oxide (SnO$_2$). The VL reflective layer 40' comprised of tin oxide also enhances a durability of the glass article 10'. It should be appreciated that the VL reflective layer 40' may comprise other suitable visible light reflecting materials such as metal oxides having a refractive index greater than 1.6 (e.g. aluminum oxide (Al$_2$O$_3$), titanium dioxide (TiO$_2$), chromium oxide (Cr$_2$O$_3$), and niobium oxide (NbO)).

In certain embodiments, the VL reflective layer 40' may be deposited by sputtering. Various other methods may be used to form the VL reflective layer 40' if desired. Although the VL reflective layer 40' may extend over substantially an entire surface of the AR layer 30', it may be formed to extend over only a portion of the surface thereof. In certain embodiments, the VL reflective layer 40' may be disposed over the AR layer 30' in an area of the HUD system 8' to reflect the visible light and allow for proper operation of the HUD system 8'. A thickness of the VL reflective layer 40' may be in a range of about 5 nm to about 20 nm, preferably in a range of about 5 nm to about 12 nm, and more preferably in a range of about 6 nm to about 9 nm. It is understood that the VL reflective layer 40' may have any suitable thickness as desired.

In a preferred embodiment, the VL reflective layer 40' may comprise a metal oxide having a refractive index of at least 1.6 and less than 1.8 and a thickness of no more than 30 nm. In more preferred embodiments, the VL reflective layer 40' may comprise a metal oxide having a refractive index of at least 1.8 and a thickness of no more than 20 nm.

In certain embodiments, the optical sensor 11' may be a light detection and ranging (LIDAR) type of sensor. Such LIDAR sensors include but are not limited to pedestrian detection sensors, pre-crash sensors, closing velocity sensors, and adaptive cruise control sensors, for example. In other embodiments, the optical sensor 11' may be an optoelectronic system comprised of at least a laser or sensing beam transmitter, at least a receiver including a light or sensing beam collector (telescope or other optics) and at least a photodetector which converts the light or sensing beam into an electrical signal, and an electronic processing chain signal that extracts the information sought.

The optical sensor 11' may be configured to emit the sensing beam through the glass article 10', which strikes a remote object. The sensing beam may be reflected off of the object, caused to pass back through the glass article 10', and detected by the receiver of the optical sensor 11'. Most often, each of the initial sensing beam emitted from the optical sensor 11' and the reflected sensing beam received by the optical sensor 11' may have the same wavelength, preferably one of the first and second wavelengths. The at least one photodetector may be configured to convert the sensing beam into the electrical signal which may be then transmitted to a controller or microcontroller (not depicted).

As illustrated, the optical sensor 11' may be disposed on the second major surface 4' of the second sheet 12'. It is understood, however, that the optical sensor 11' may be positioned at other suitable locations on or adjacent to the glass article 10'. In certain embodiments, the optical sensor 11' may be positioned in alignment with the void 26' formed in the at least one reflecting layer 24' and at least a portion of the AR layer 30' to minimize interference and maximize the transmission % of at least one of the wavelengths through the glass article 10', which results in improved accuracy and reliability of the optical sensor 11'.

In one preferred embodiment, the glass article 10' includes the first sheet 12' having the first ply 18 of the multi-ply adhesive layer 16' disposed adjacent the second major surface 2' thereof. The at least one reflecting layer 24' may be disposed adjacent the second surface 18b of the first ply 18. The second ply 20' may be disposed adjacent the at least one reflecting layer 24'. More particularly, the at least one reflecting layer 24' of silver may be deposited on the first surface 20a of the second ply 20 by sputtering. The void 26' may be formed in the at least one reflecting layer 24' at the desired location of the void 26' during the manufacturing of the glass article 10'. The third ply 22 may be then disposed adjacent the second surface 20b of the second ply 20. The second sheet 14' may be disposed adjacent the second surface 22b of the third ply 22. The AR layer 30' may be then deposited onto the second major surface 4' of the second sheet 14'. The VL reflective layer 40' may be then disposed adjacent the AR layer 30'. The optical sensor 11' may be disposed adjacent a surface 42' of the VL reflective layer 40' in alignment with the void 26' formed in the at least one reflecting layer 24'.

As detailed in FIG. 4, when the glass article 10 is an uncoated laminated glazing (e.g. without the AR layer 30 and the VL reflective layer 40), the glass article 10 exhibits a visible light reflectance value of about 8.7% at an exterior surface (R-1) of the glass article 10, a visible light reflectance value of about 8.7% at an interior surface (R-4) of the glass article 10, about a 88.4% light transmission (when measured with CIE Illuminant A) at the first wavelength (e.g. 905 nm) when positioned substantially vertical, and about a 81% light transmission (when measured with CIE Illuminant A) at the first wavelength (e.g. 905 nm) when positioned at a rake angle of about 60° from vertical.

When the glass article 10 is a laminated glazing including the AR layer 30 comprising of 130 nm silicon dioxide ($SiO_2$), the glass article 10 exhibits a visible light reflectance value of about 7.2% at an exterior surface (R-1) of the glass article 10, a visible light reflectance value of about 7.2% at an interior surface (R-4) of the glass article 10, about a 90.5% transmission at the first wavelength (e.g. 905 nm) when positioned substantially vertical, and about a 82.4% transmission at the first wavelength (e.g. 905 nm) when positioned at a rake angle of about 60° from vertical.

When the glass article 10 is a laminated glazing including the AR layer 30 comprising of 130 nm silicon dioxide ($SiO_2$) and the VL reflective layer 40 comprising of 8 nm of tin oxide ($SnO_2$), the glass article 10 exhibits a visible light reflectance value of about 8.6 at an exterior surface (R-1) of the glass article 10, a visible light reflectance value of about 8.6% at an interior surface (R-4) of the glass article 10, about a 90.5% transmission at the first wavelength (e.g. 905 nm) when positioned substantially vertical, and about a 82.5% transmission at the first wavelength (e.g. 905 nm) when positioned at a rake angle of about 60° from vertical.

Referring now to FIG. 5, the glass article 10" is a laminated glazing shown according to another embodiment of the presently disclosed subject matter. The glass article 10" is similar to that shown in FIGS. 2 and 3. Reference numerals for similar structure in respect of the description of FIGS. 2 and 3 is repeated in FIG. 5 with a double prime (") symbol. The glass article 10" illustrated in FIG. 5 may be suitable for building applications. The glass article 10" includes the first sheet 12", the adhesive layer 16" disposed adjacent the first sheet 12", and the second sheet 14" disposed adjacent the adhesive layer 16". The AR layer 30" may be then deposited onto the second major surface 4" of the second sheet 14". The VL reflective layer 40" may be then disposed adjacent the AR layer 30".

FIG. 6 illustrates the glass article 10''' according to another embodiment of the presently disclosed subject matter. The glass article 10''' is similar to that shown in FIGS. 2, 3, and 5. However, the glass article 10''' is monolithic. Reference numerals for similar structure in respect of the description of FIGS. 2, 3, and 5 is repeated in FIG. 6 with a triple prime (''') symbol. The glass article 10''' may also be suitable for building applications. The glass article 10''' may include a single glass sheet 12'''. In certain embodiments, the glass sheet 12''' may have a thickness of about 2.3 mm. The AR layer 30''' may be then deposited onto the second major surface 2''' of the glass sheet 12'''. The VL reflective layer 40''' may be then disposed adjacent the AR layer 30'''.

Referring now to FIG. 7, the table provides various characteristics of an uncoated monolithic glass article, a monolithic glass article coated with the AR layer 30''' of silicon dioxide ($SiO_2$), a monolithic glass article coated with the AR layer 30''' of silicon dioxide ($SiO_2$) having a thickness of about 146 nm, the monolithic glass article 10''' coated with the AR layer 30''' of silicon dioxide ($SiO_2$) having a thickness of about 146 nm and the VL reflective layer 40''' of tin oxide ($SnO_2$) having a thickness of about 10 nm, and the monolithic glass article 10''' coated with the AR layer 30''' of silicon dioxide ($SiO_2$) having a thickness of about 146 nm and the VL reflective layer 40''' of tin oxide ($SnO_2$) having a thickness of about 12 nm. As shown, the uncoated monolithic glass article (e.g. without the AR layer 30''' and the VL reflective layer 40''') exhibits about a 92.3% visible light transmission (when measured with CIE Illuminant A), about a 0.06 haze value, a visible light reflectance value of about 8.8%, coordinates a* of about −0.12 and b* of about −0.93 (which define color in accordance with CIELAB color scale system), and about a 90.5% infrared light transmission (when measured with CIE Illuminant A) at the first wavelength (e.g. 905 nm). The coated monolithic glass article including only the AR layer 30''' exhibits about a 93.2% visible light transmission (when measured with CIE Illuminant A), about a 0.06 haze value, a visible light reflectance value of about 7.8%, coordinates a* of about −0.44 and b* of about −3.2 (which define color in accordance with CIELAB color scale system), and about a 92.0% infrared light transmission (when measured with CIE Illuminant A) at the first wavelength (e.g. 905 nm). The coated monolithic glass article 10''' including the AR layer 30''' and the VL reflective layer 40''' exhibits about a 92.4% visible light transmission (when measured with CIE Illuminant A), about a 0.07 haze value, a visible light reflectance value of about 8.45%, coordinates a* of about −0.8 and b* of about −3.5 (which define color in accordance with CIELAB color scale system), and about a 92.0% infrared light transmission (when measured with CIE Illuminant A) at the first wavelength (e.g. 905 nm). The coated monolithic glass article 10''' including the AR layer 30''' and the VL reflective layer 40''' exhibits about a 92.4% visible light transmission (when measured with CIE Illuminant A), about a 0.07 haze value, a visible light reflectance value of about 8.65%, coordinates a* of about −0.85 and b* of about −3.6 (which define color in accordance with CIELAB color scale system), and about a 92.1% infrared light transmission (when measured with CIE Illuminant A) at the first wavelength (e.g. 905 nm). Notably, the coated monolithic glass article 10''' including the AR layer 30''' and the VL reflective layer 40''' has a visible light reflectance value comparable to the uncoated monolithic glass article, which provides sufficient visible light reflection for proper operation of the HUD system 8, as well as a 92.0% infrared light transmission (when measured with CIE Illuminant A) at the first wavelength (e.g. 905 nm), which is sufficient for proper operation of the optical sensor 11.

From the foregoing description, one ordinarily skilled in the art can easily ascertain the essential characteristics of the subject matter of the embodiments described herein and, without departing from the spirit and scope thereof, can make various changes and modifications to the embodiments to adapt them to various usages and conditions.

The invention claimed is:
1. A coated glass article, comprising:
a first glass sheet;
an antireflective layer disposed adjacent at least a portion of the first glass sheet; and
a visible light reflective layer disposed over at least a portion of the antireflective layer, the visible light reflective layer having a refractive index of at least 1.6 and a thickness of no more than 30 nm;
wherein the coated glass article exhibits a light transmission of at least 80% for at least one wavelength of infrared light and a visible light reflectance of between about 8% and 10%.

2. The coated glass article of claim 1, wherein the first glass sheet is produced from a glass material having an iron content 100 ppm or less, preferably 10 ppm or less.

3. The coated glass article of claim 1, further comprising a second glass sheet, wherein the first and second glass sheets are joined together by an adhesive layer.

4. The coated glass article of claim 3, wherein the adhesive layer includes at least one ply of at least one of polyvinyl butyral (PVB), ethylene vinyl acetate (EVA), polyvinyl chloride (PVC), polyurethane (PU), acoustic modified PVB and a liquid curable acrylic resin or wherein the adhesive layer comprises a plurality of plies including a first ply formed of PVB, a second ply formed of polyethylene terephthalate (PET), and a third ply formed of PVB.

5. The coated glass article of claim 3, further comprising at least one reflecting layer.

6. The coated glass article of claim 5, wherein the at least one reflecting layer is disposed adjacent at least a portion of one of the first sheet and the second sheet.

7. The coated glass article of claim 5, wherein the at least one reflecting layer comprises a metal material or a tin-doped indium oxide or a lanthanum hexaboride.

8. The coated glass article of claim 5, wherein the at least one reflecting layer includes at least one void formed therein.

9. The coated glass article of claim 3, wherein each of the first sheet and the second sheet includes a first major surface and a second major surface, and wherein the antireflective layer is disposed adjacent at least a portion of the second major surface of the second sheet.

10. The coated glass article of claim 1, wherein the antireflective layer has a thickness of about 120 nm to about 150 nm.

11. The coated glass article of claim 1, wherein the antireflective layer is formed of silicon dioxide ($SiO_2$) or titanium dioxide ($TiO_2$).

12. The coated glass article of claim 1, wherein the antireflective layer facilitates a light transmission of at least 94% for the at least one wavelength through the coated glass article.

13. The coated glass article of claim 1, wherein the at least one wavelength about 905 nm or 1550 nm.

14. The coated glass article of claim 5, further comprising an optical sensor disposed adjacent at least one of the antireflective layer and the visible light reflective layer, wherein the optical sensor is configured to emit a light beam having the at least one wavelength and is positioned in alignment with a void formed in the at least one reflecting layer of the coated glass article.

15. The coated glass article of claim 1, wherein the visible light reflective layer has a thickness in a range of about 6 nm to about 9 nm.

16. The coated glass article of claim 1, wherein the visible light reflective layer is a metal oxide having a refractive index of at least 1.6 and less than 1.8 and a thickness of no more than 30 nm or a refractive index of at least 1.8 and a thickness of no more than 20 nm.

17. The coated glass article of claim 1, wherein the visible light reflective layer is formed of tin oxide ($SnO_2$), aluminum oxide ($Al_2O_3$), titanium dioxide ($TiO_2$), chromium oxide ($Cr_2O_3$) or niobium oxide (NbO).

18. The coated glass article of claim 1, wherein the visible light reflective layer facilitates a visible light reflectance value of about 8.6% at an exterior surface of the coated glass article and a visible light reflectance value of about 8.6% at an interior surface of the coated glass article.

19. The coated glass article of claim 1, wherein the visible light reflective layer is disposed over at least a portion of the antireflective layer in an area of a heads-up-display (HUD) system.

20. A method of producing a coated glass article, comprising:
providing a first sheet;
disposing an antireflective layer adjacent the first sheet; and
disposing a visible light reflective layer on at least a portion of the antireflective layer, the visible light reflective layer having a refractive index of at least 1.6 and a thickness of no more than 30 nm; wherein
the coated glass article exhibits a light transmission of at least 80% for at least one wavelength of infrared light and a visible light reflectance of between about 8% and 10%.

21. A coated glass article, comprising:
a first glass sheet;
an antireflective layer disposed directly on at least a portion of the first glass sheet; and
a visible light reflective layer disposed directly on at least a portion of the antireflective layer, the visible light reflective layer having a refractive index of at least 1.6 and a thickness of no more than 30 nm;
wherein the coated glass article exhibits a light transmission of at least 80% for at least one wavelength of infrared light and a visible light reflectance of between about 8% and 10%.

* * * * *